United States Patent
Kuo

(10) Patent No.: US 7,066,044 B2
(45) Date of Patent: Jun. 27, 2006

(54) TRANSMISSION APPARATUS

(75) Inventor: Tsung-Jung Kuo, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 41 days.

(21) Appl. No.: 10/920,259

(22) Filed: Aug. 18, 2004

(65) Prior Publication Data

US 2005/0039559 A1   Feb. 24, 2005

(30) Foreign Application Priority Data

Aug. 19, 2003 (TW) .............................. 92215038 U

(51) Int. Cl.
*F16H 57/00* (2006.01)
*F16H 55/18* (2006.01)

(52) U.S. Cl. ........................ 74/411; 74/440; 74/89.17

(58) Field of Classification Search ............ 74/422, 74/411, 406, 89.17, 409, 440
See application file for complete search history.

(56) References Cited

U.S. PATENT DOCUMENTS

| 4,130,024 | A | * | 12/1978 | Hayasaka et al. | ............... 74/29 |
| 5,307,339 | A | * | 4/1994 | Tanaka | ........................ 720/664 |
| 2004/0035235 | A1 | * | 2/2004 | Sasaki et al. | ................. 74/422 |

FOREIGN PATENT DOCUMENTS

WO   WO 03/036135 A1 *  1/2003

* cited by examiner

*Primary Examiner*—Richard Ridley
*Assistant Examiner*—Justin Krause
(74) *Attorney, Agent, or Firm*—Birch, Stewart, Kolasch & Birch, LLP

(57) ABSTRACT

A transmission apparatus includes a gear having a plurality of gear teeth and a rack having a plurality of rack teeth to mesh with the gear teeth. The rack further has an end formed as a cantilever beam structure. In an initial contact of the gear teeth with the rack teeth at the cantilever beam structure of the rack, the cantilever beam structure can deflect to buffer an impact resulted from the contact so that the meshing of the gear teeth and the rack teeth can be much smoother and possible collision in between can also be avoided.

5 Claims, 6 Drawing Sheets

TRANSMISSION APPARATUS

This Nonprovisional application claims priority under 35 U.S.C. § 119(a) on Patent Application No(s). 092215038 filed in Taiwan, Republic of China on Aug. 19, 2003, the entire contents of which are hereby incorporated by reference.

BACKGROUND OF THE INVENTION (1) Field of the Invention

The invention relates to a transmission apparatus, and more particularly to a transmission apparatus including a gear and a rack which the gear and the rack can mesh smoothly without accidental tooth collision.

(2) Description of the Prior Art

In the industry, transmission apparatus is widely used in every field for power transmission, alternation of power motion, speed reduction and so on. Common components seen in a typical transmission apparatus are gears, racks, transmission shafts, chains, etc.

Referring to FIG. 1, a conventional transmission apparatus is shown to have a spur gear 1 and a mating rack 2. The spur gear 1 as the driving end of the transmission apparatus is fixed on a driving shaft 3 connecting a motor (not shown here). As shown, the spur gear 1 is rotated clockwise (direction B) to have the respective mating rack 2 move along a linear direction A. During continuous meshing between gear teeth 11 of the spur gear 1 and rack teeth 21 of the rack 2, the rotation of the spur gear 1 can drive the rack 2 to move linearly along the direction A. As shown in FIGS. 2, 3, and 4, a typical teeth mesh between the gear teeth 11 and the rack teeth 21 is demonstrated continuously. For example, when the rack 2 is moved by an exterior force, the rack 2 is pushed toward the gear 1 as shown in FIG. 2 to mesh the gear tooth 11 and the rack tooth 21. Then as shown in the FIG. 3, the gear tooth 11 engages the rack tooth 21 and the gear 1 start to drive the rack 2 as shown in FIG. 4.

Referring to FIG. 5, it is quite often that the mesh between the gear tooth 11 and the rack tooth 21 is initiated by a hitting, or say gear interference, of the gear tooth 11 onto the rack tooth 21, i.e. an accidental collision in between. In particular, such an accidental collision may interrupt the transmission between the spur gear 1 and the rack 2.

To improve the accidental collision between teeth 11, 21, a leading rack tooth 22 with a cutout portion is introduced to initiate the mesh between the spur gear 1 and the rack 2. Upon such an arrangement, the initial teeth hitting between the spur gear 1 and the rack 2 can be lessened.

Though the improvement as shown in FIG. 6 can somehow resolve the initial teeth hitting problem, yet the leading rack tooth 22 is weak in strength and thus may shorten the service lifetime of the rack 2 as well as the transmission apparatus.

SUMMARY OF THE INVENTION

Accordingly, it is an object of the present invention to provide a transmission apparatus having a driving gear and a driven rack, in which the rack has a cantilever beam structure for gaining substantial elasticity so as to smooth out the meshing between the gear and the rack.

To achieve the foregoing object, the transmission apparatus in accordance with the present invention includes a gear having a plurality of gear teeth and a rack having a plurality of rack teeth to mesh with the gear teeth. A cantilever beam structure is constructed at one end of the rack by forming a lower wedge cutout. The wedge cutout provides the end of the rack to have substantial elasticity for preventing from possible interference during the meshing of the gear teeth and the rack teeth.

Further, for the cantilever beam structure of the rack of the present invention to replace the leading tooth design in the conventional rack, all the rack teeth can have the same tooth profile so that no more reduced strength problem in a particular rack tooth can exist to shorten the service lifetime of the transmission apparatus.

All these objects are achieved by the transmission apparatus described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a transmission apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
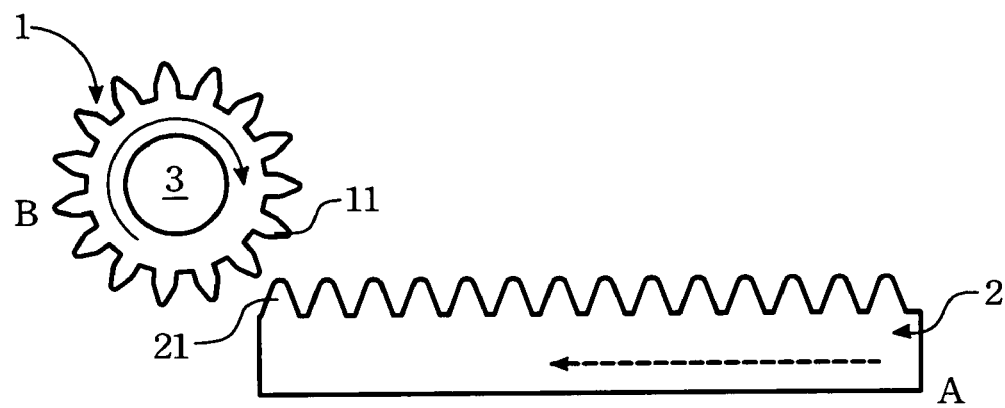
FIG. 1 is a schematic view of a conventional transmission apparatus.
Figure 2:
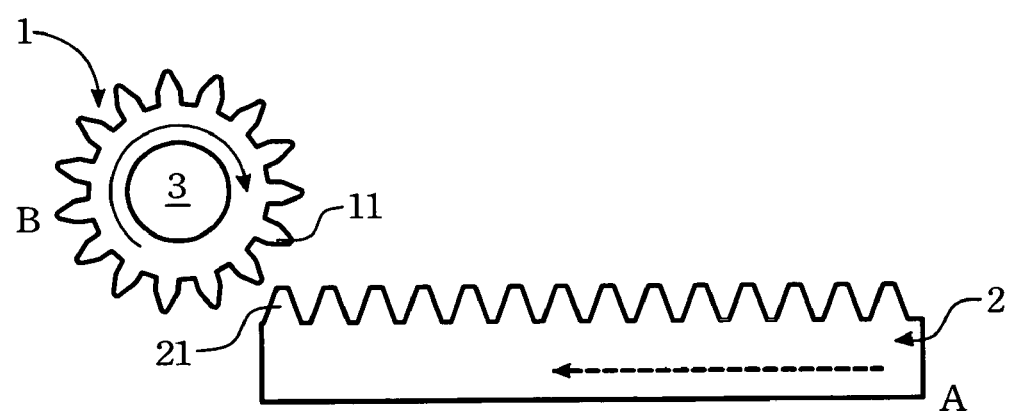
FIG. 2 shows schematically a pre-engagement state of a gear tooth and a respective rack tooth.
Figure 3:
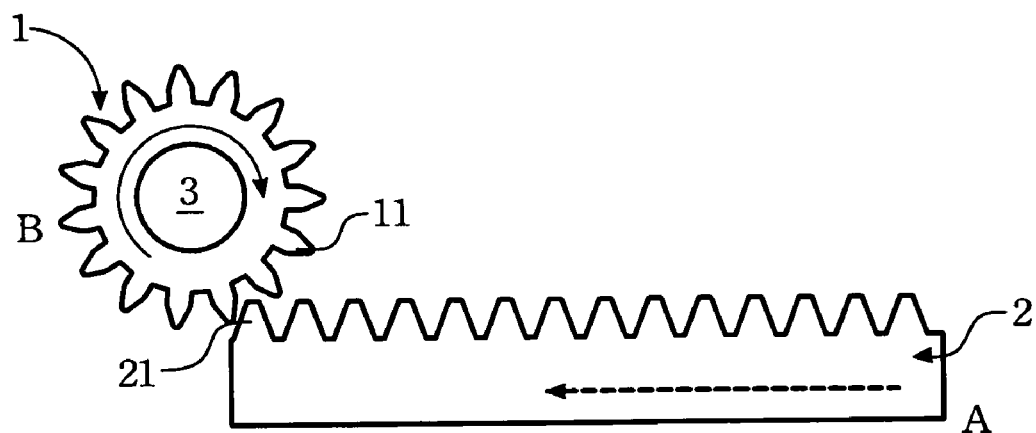
FIG. 3 shows schematically an initial-engagement state of the gear tooth and the respective rack tooth.
Figure 4:
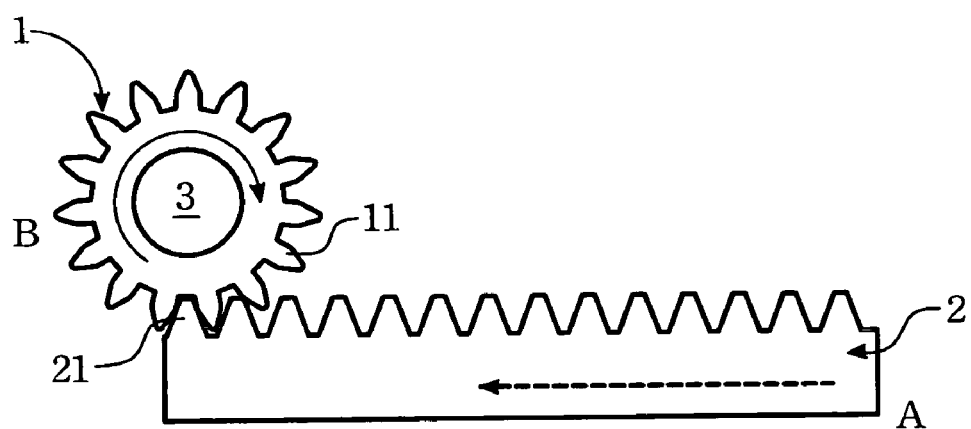
FIG. 4 shows schematically an engagement state of the gear tooth and the respective rack tooth.
Figure 5:
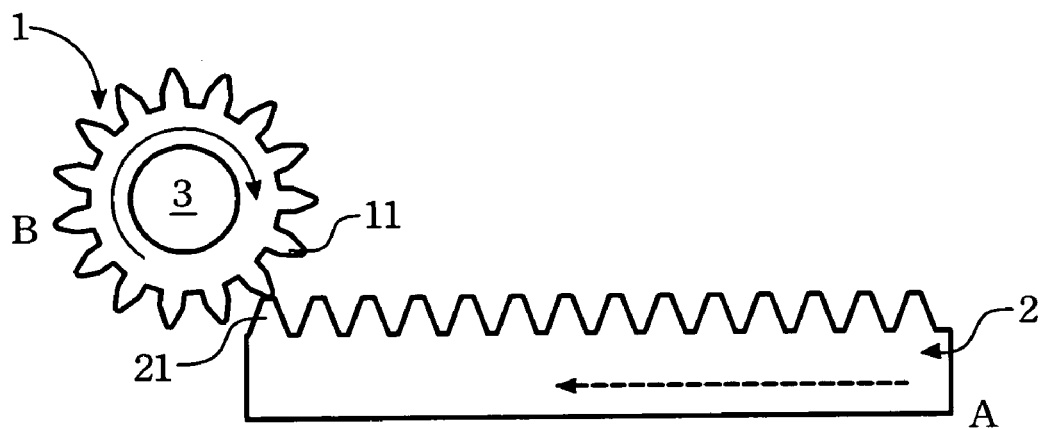
FIG. 5 shows schematically a state of gear interference during a meshing of a gear tooth and a respective rack tooth.
Figure 6:
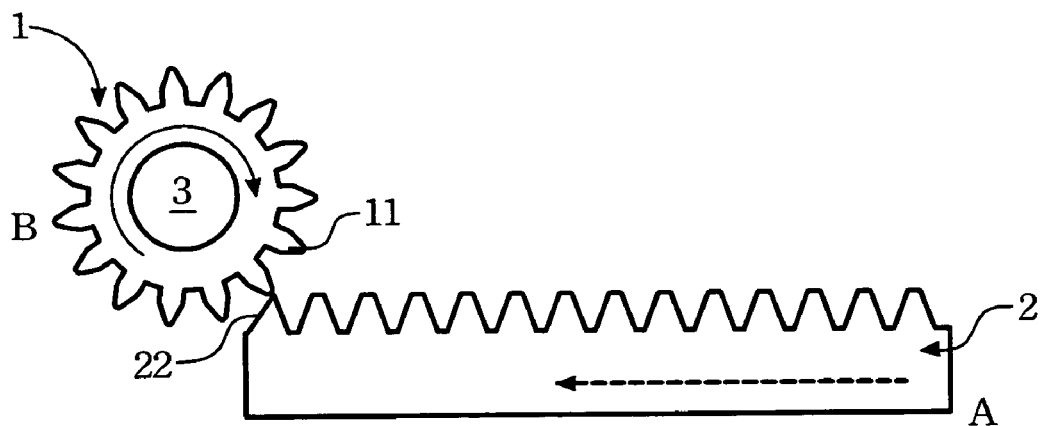
FIG. 6 is a schematic view of another conventional transmission apparatus.
Figure 7:
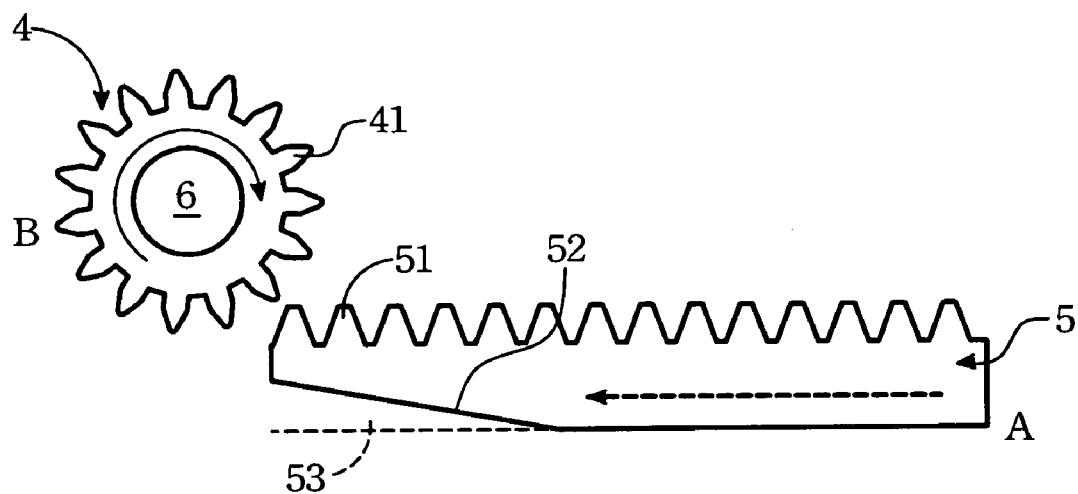
FIG. 7 is a schematic view of a preferred transmission apparatus in accordance with the present invention.

Referring now to FIG. 7, a preferred embodiment of the transmission apparatus in accordance with the present invention is shown. The transmission apparatus includes a gear 4 and a rack 5. The gear 4 fixed to a driving shaft 6 connecting with a motor is driven to rotate along a direction B as shown. In the present invention, the gear 4, preferable to be a spur gear, includes a plurality of gear teeth 41. The rack 5, located along a tangential direction A of the gear 4 and movable back and forth along the direction A, includes a plurality of rack teeth 51 to mesh with the gear teeth 41 of the gear.

In the present invention, one end of the rack 5 (the end close to the gear 4) is formed as a cantilever beam structure 52 by having a wedge cutout 53 at a lower portion of the end. As shown, the wedge cutout 53 has its wider side formed at a tip of the end of the rack 5. Upon such an arrangement, the rack 5 can have an ability to deflect elastically at the end having the cantilever beam structure 52.

Figure 8:
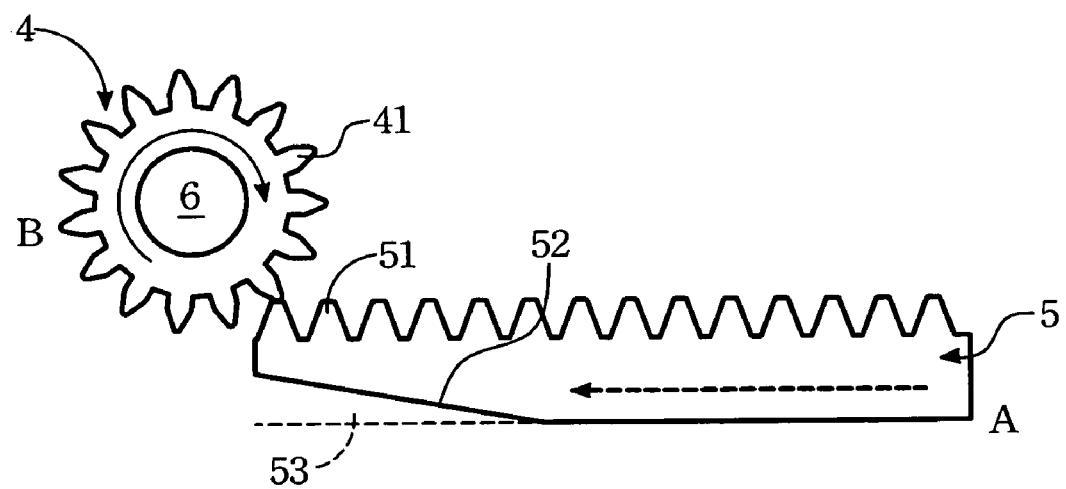
FIG. 8 shows schematically an initial-engagement state of a gear tooth and a respective rack tooth of FIG. 7.
Figure 9:
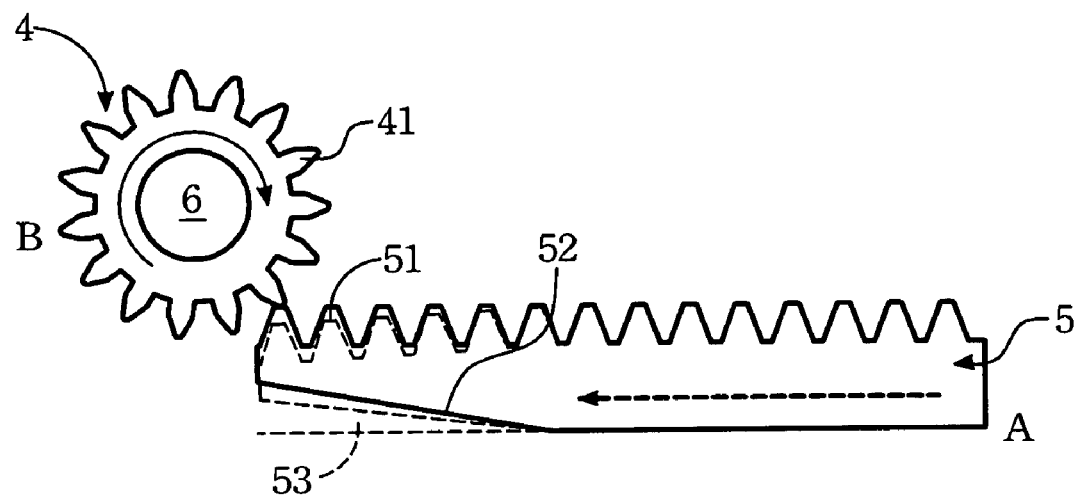
FIG. 9 shows schematically a typical deflection of the rack during the initial-engagement state of FIG. 8.
Figure 10:
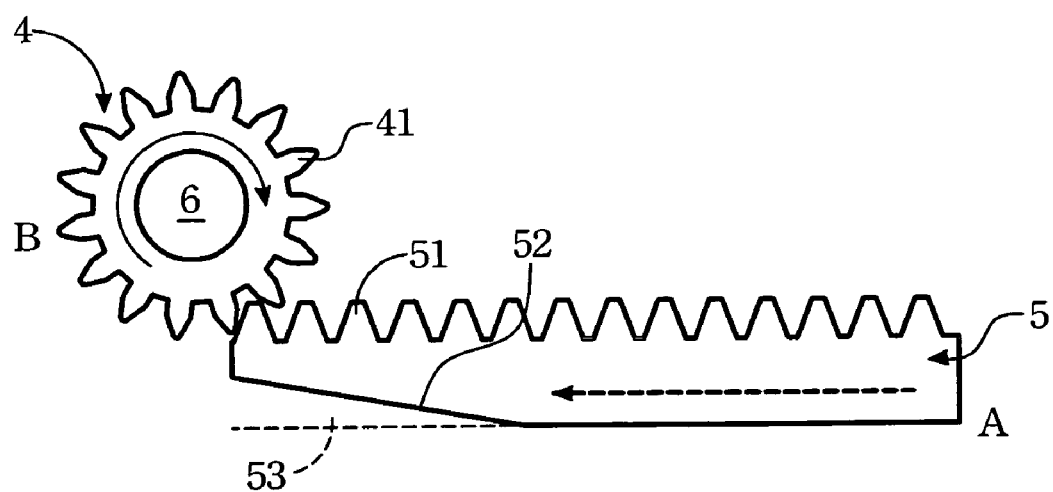
FIG. 10 shows schematically an engagement state of the gear tooth and the respective rack tooth of FIG. 8.
Figure 11:
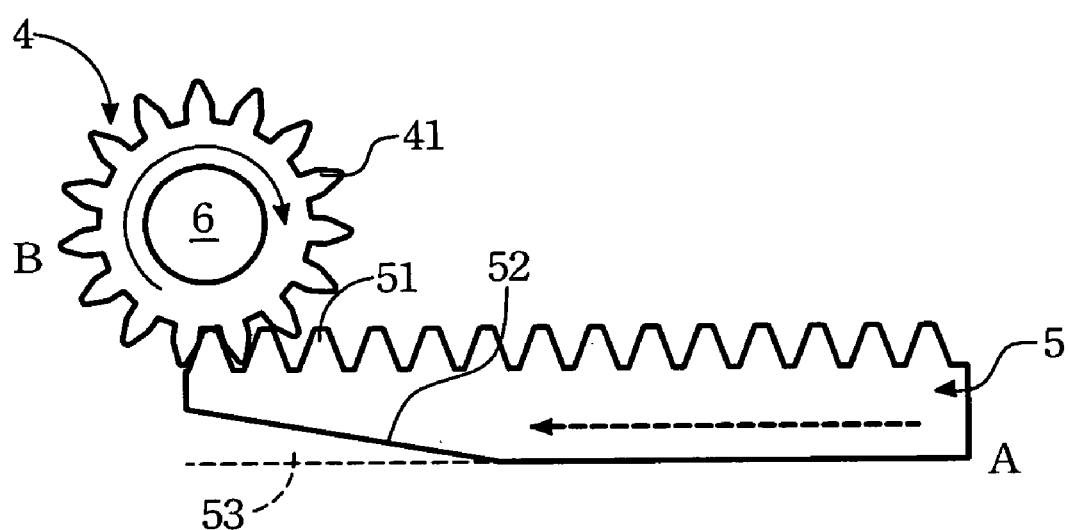
FIG. 11 shows schematically the meshing of the gear teeth and the respective rack teeth of FIG. 8.

Refer now to FIGS. 8, 9, 10 and 11. When the rack 5 is moved by an external force along the direction A to engage with the gear 4, an initial contact of the gear teeth 41 moving along the direction B and the rack teeth 51 moving along the direction A could happen to an impact upon a tooth top of a leading rack tooth 51 as shown in FIG. 8. The impact can suddenly deflect elastically downward the cantilever beam structure 52 of the rack 5 as shown in FIG. 9 to buffer the initial impact in between. As illustrated in FIG. 10, after a further slight movement of the gear 4 and the rack 5, the deflected cantilever beam structure 52 of the rack 52 can resume gradually and have the engagement between the gear teeth 41 and the rack teeth 51 much smoother. Thus as shown in FIG. 11, the gear 4 can start to drive the rack 5 with the gear teeth 41 and the rack teeth 51 meshed. By providing the cantilever beam structure 52 to the rack 5 in accordance with the present invention, the problem of gear interference to jam the engagement of the transmission apparatus will be successfully avoided.

As described above, during the meshing of the gear 4 and the rack 5 of the transmission apparatus, the cantilever beam structure 52 of the present invention, in replacement of the conventional leading tooth with a cutout portion, does not alter the tooth profile at any rack tooth 51 of the rack 5 so that no more reduced strength problem in a particular rack tooth can happen to shorten the service lifetime of the transmission apparatus.

While the present invention has been particularly shown and described with reference to a preferred embodiment, it will be understood by those skilled in the art that various changes in form and detail may be without departing from the spirit and scope of the present invention.

I claim:

1. A transmission apparatus, comprising:
    a gear having a plurality of gear teeth; and
    a rack having a plurality of rack teeth to mesh with the gear teeth, further having an end thereof formed as a cantilever beam structure, said cantilever beam structure is formed by having a wedge cutout at a lower portion of said end of said rack;
    wherein an initial contact of the gear teeth with the rack teeth at the cantilever beam structure of the rack deflects the cantilever beam structure to buffer an impact resulted from the contact.

2. The transmission apparatus according to claim 1, wherein said gear is a spur gear.

3. The transmission apparatus according to claim 1, wherein said wedge cutout has a wider side formed at a tip of said end of said rack.

4. The transmission apparatus according to claim 1, wherein said gear is fixed to a driving shaft connecting to a motor.

5. The transmission apparatus according to claim 1, wherein said rack is moved by an external force to occur said initial contact.

* * * * *